United States Patent
Bae et al.

(10) Patent No.: US 10,790,528 B2
(45) Date of Patent: Sep. 29, 2020

(54) POLYMER ELECTROLYTE MEMBRANE PRODUCTION METHOD, POLYMER ELECTROLYTE MEMBRANE PRODUCED USING SAME, MEMBRANE ELECTRODE ASSEMBLY COMPRISING SAID POLYMER ELECTROLYTE MEMBRANE, AND FUEL CELL COMPRISING SAID MEMBRANE ELECTRODE ASSEMBLY

(71) Applicant: LG CHEM, LTD., Seoul (KR)

(72) Inventors: Insung Bae, Daejeon (KR); Keunhwan Oh, Daejeon (KR); Sunhwa Kim, Daejeon (KR); Hyuk Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 154 days.

(21) Appl. No.: 15/754,235

(22) PCT Filed: Apr. 28, 2017

(86) PCT No.: PCT/KR2017/004566
§ 371 (c)(1),
(2) Date: Feb. 21, 2018

(87) PCT Pub. No.: WO2017/191950
PCT Pub. Date: Nov. 9, 2017

(65) Prior Publication Data
US 2018/0248213 A1    Aug. 30, 2018

(30) Foreign Application Priority Data

May 4, 2016    (KR) .................. 10-2016-0055740
Apr. 27, 2017    (KR) .................. 10-2017-0054523

(51) Int. Cl.
*H01M 8/1088* (2016.01)
*H01M 8/1025* (2016.01)
(Continued)

(52) U.S. Cl.
CPC .......... *H01M 8/1088* (2013.01); *C08G 65/00* (2013.01); *C08J 3/24* (2013.01); *C08J 5/2256* (2013.01);
(Continued)

(58) Field of Classification Search
CPC . H01M 8/1088; H01M 8/1004; H01M 8/1025
See application file for complete search history.

(56) References Cited

U.S. PATENT DOCUMENTS

| 2010/0261091 | A1 | 10/2010 | Lee et al. |
| 2012/0309857 | A1 | 12/2012 | Hwang et al. |
| 2016/0233475 | A1* | 8/2016 | Son ................. H01M 2/145 |

FOREIGN PATENT DOCUMENTS

| CN | 101928393 A | 12/2010 |
| CN | 102807668 A | 12/2012 |

(Continued)

OTHER PUBLICATIONS

European Search Report for Appl. No. 17792852.0 dated Jun. 20, 2018.
(Continued)

*Primary Examiner* — Jonathan G Jelsma
(74) *Attorney, Agent, or Firm* — Birch, Stewart, Kolasch & Birch, LLP

(57) ABSTRACT

The present specification provides a method for preparing a polymer electrolyte membrane including reducing a ketone group of a polyarylene ether ketone polymer of a polymer electrolyte membrane; and treating the polymer electrolyte membrane with sulfuric acid, a polymer electrolyte membrane prepared using the same, a membrane electrode assembly including the polymer electrolyte membrane, and a fuel cell including the membrane electrode assembly.

13 Claims, 3 Drawing Sheets

COMPARATIVE EXAMPLE 1

EXAMPLE 1

(51) Int. Cl.
  *H01M 8/1004*   (2016.01)
  *C08J 5/22*     (2006.01)
  *H01M 8/1046*   (2016.01)
  *H01M 8/1072*   (2016.01)
  *C08G 65/00*    (2006.01)
  *C08J 3/24*     (2006.01)
  *H01M 8/1018*   (2016.01)

(52) U.S. Cl.
  CPC ....... *H01M 8/1004* (2013.01); *H01M 8/1025* (2013.01); *H01M 8/1046* (2013.01); *H01M 8/1072* (2013.01); *C08J 2371/00* (2013.01); *H01M 2008/1095* (2013.01); *H01M 2300/0082* (2013.01); *Y02P 70/56* (2015.11)

(56) References Cited

FOREIGN PATENT DOCUMENTS

| | | | |
|---|---|---|---|
| CN | 103811776 A | * | 5/2014 |
| EP | 3 059 784 A1 | | 8/2016 |
| KR | 10-2007-0013840 A | | 1/2007 |
| KR | 10-2009-0037306 A | | 4/2009 |
| KR | 10-2009-0039180 A | | 4/2009 |
| KR | 10-2010-0098234 A | | 9/2010 |
| KR | 10-2012-0092055 A | | 8/2012 |
| KR | 10-2015-0045361 A | | 4/2015 |
| WO | WO 2014/157389 A1 | | 10/2014 |

OTHER PUBLICATIONS

International Search Report for PCT/KR2017/004566 (PCT/ISA/210) dated Aug. 17, 2017.

* cited by examiner

[FIG. 1]
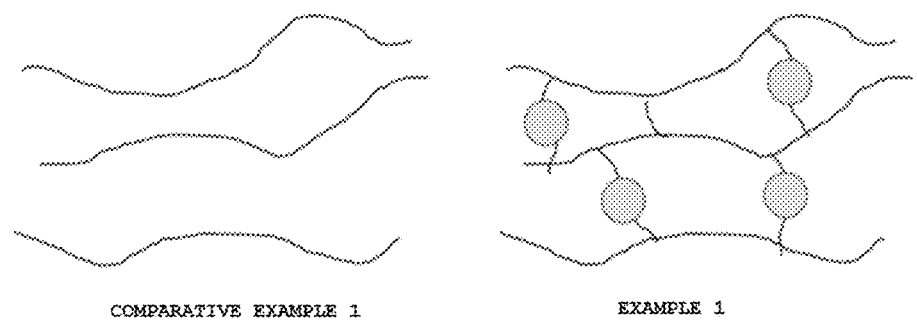
COMPARATIVE EXAMPLE 1          EXAMPLE 1
[FIG. 2]
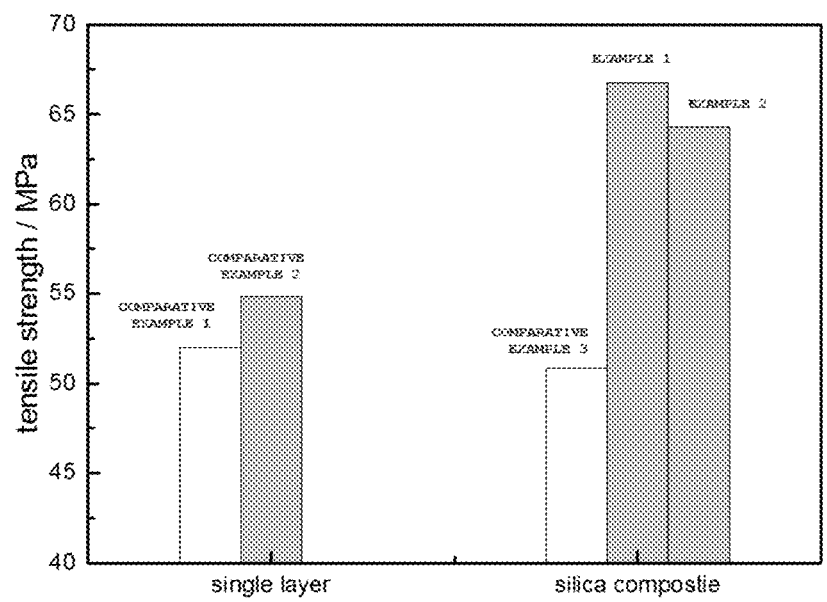

[FIG. 3]
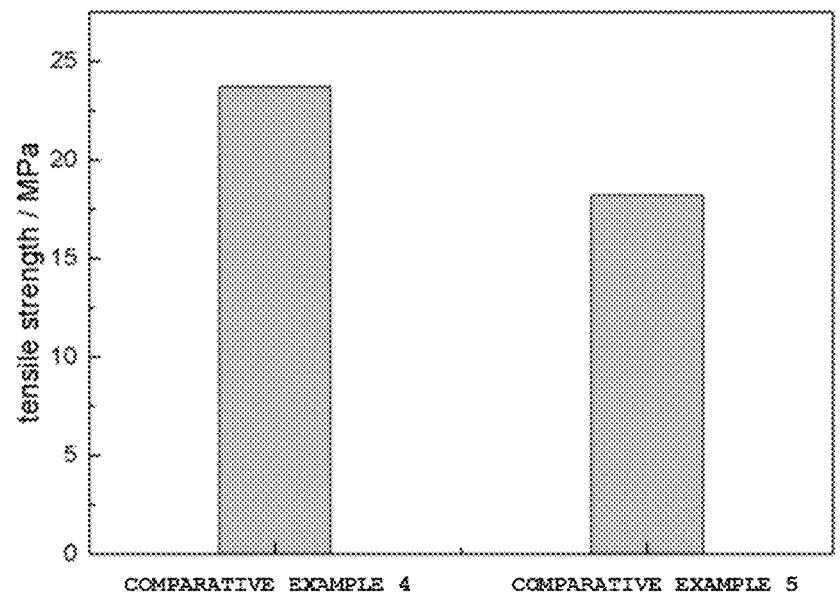
[FIG. 4]
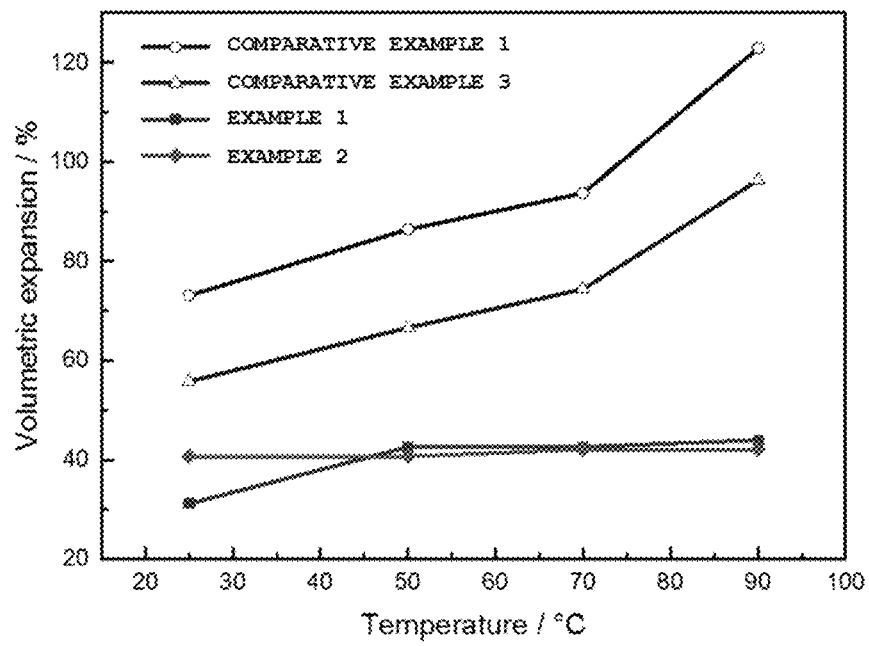

【FIG. 5】
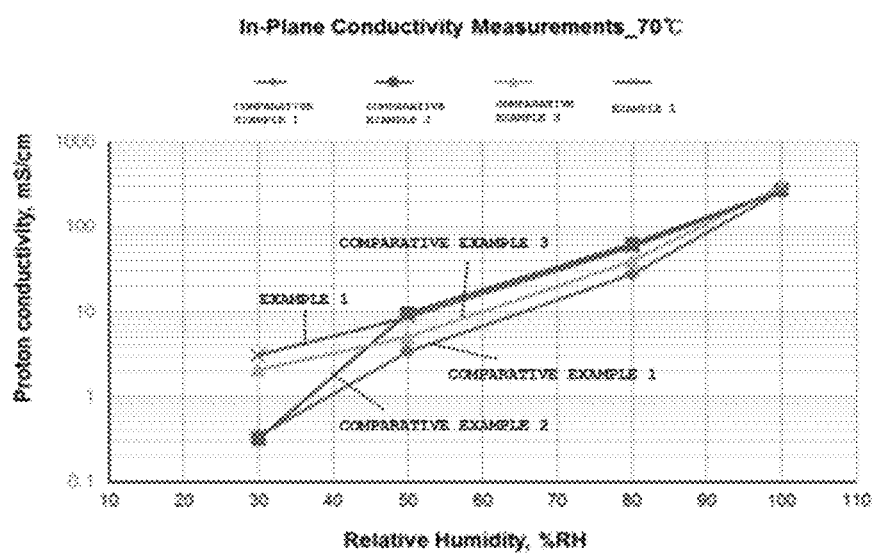
【FIG. 6】
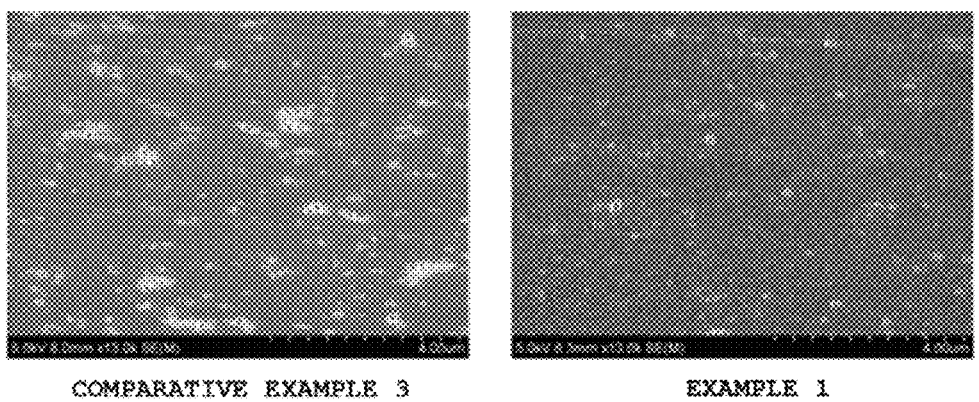

POLYMER ELECTROLYTE MEMBRANE PRODUCTION METHOD, POLYMER ELECTROLYTE MEMBRANE PRODUCED USING SAME, MEMBRANE ELECTRODE ASSEMBLY COMPRISING SAID POLYMER ELECTROLYTE MEMBRANE, AND FUEL CELL COMPRISING SAID MEMBRANE ELECTRODE ASSEMBLY

TECHNICAL FIELD

This application claims priority to and the benefits of Korean Patent Application No. 10-2016-0055740, filed with the Korean Intellectual Property Office on May 4, 2016, and Korean Patent Application No. 10-2017-0054523, filed with the Korean Intellectual Property Office on Apr. 27, 2017, the entire contents of which are incorporated herein by reference.

The present specification relates to a method for preparing a polymer electrolyte membrane, a polymer electrolyte membrane prepared using the same, a membrane electrode assembly including the polymer electrolyte membrane and a fuel cell including the membrane electrode assembly.

BACKGROUND ART

In a fuel cell including a polymer electrolyte membrane, superiority of a fluorine-based polymer electrolyte membrane is widely known for its high performance and durability. Particularly, in a fluorine-based polymer electrolyte membrane, it is identified that durability is stably exhibited in a mechanical property evaluation through a relative humidity cycle test (RH cycle test). However, studies on a hydrocarbon-based polymer electrolyte membrane have been much progressed with higher price competitiveness of a hydrocarbon-based polymer electrolyte membrane compared to a fluorine-based polymer electrolyte membrane. In order to increase ion conductivity of a hydrocarbon-based polymer electrolyte membrane to a fluorine-based polymer electrolyte membrane level, polymers having a low equivalent weight value are mainly synthesized, however, mechanical durability tends to further decrease in a hydrocarbon-based polymer having a low equivalent weight value. Accordingly, studies for enhancing mechanical durability shown in a relative humidity cycle test (RH cycle test) through blending have been mainly progressed.

DISCLOSURE

Technical Problem

The present specification is directed to providing a method for preparing a polymer electrolyte membrane, a polymer electrolyte membrane prepared using the same, a membrane electrode assembly including the polymer electrolyte membrane and a fuel cell including the membrane electrode assembly.

Technical Solution

One embodiment of the present specification provides a method for preparing a polymer electrolyte membrane including preparing an electrolyte membrane including a polyarylene ether ketone polymer including a unit of the following Chemical Formula 1 and having a sulfonate group and inorganic nanoparticles including a hydroxyl group on a surface; reducing a ketone group of the polyarylene ether ketone polymer; and crosslinking the reduced polyarylene ether ketone polymer and the inorganic nanoparticles by treating the electrolyte membrane with sulfuric acid.

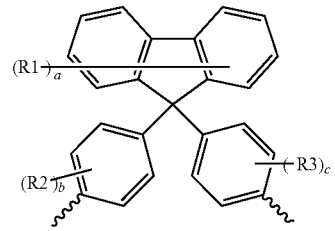

[Chemical Formula 1]

In Chemical Formula 1, R1 to R3 are the same as or different from each other, and each independently hydrogen, an alkyl group or an aryl group, a is an integer of 0 to 8 and b and c are each an integer of 0 to 4, and when a to c are 2 or greater, substituents in the parentheses are the same as or different from each other.

Another embodiment of the present specification provides a method for preparing a polymer electrolyte membrane including reducing a ketone group of a polyarylene ether ketone polymer including the unit of Chemical Formula 1 and having a sulfonate group; preparing an electrolyte membrane including the reduced polyarylene ether ketone polymer and inorganic nanoparticles including a hydroxyl group on a surface; and crosslinking the reduced polyarylene ether ketone polymer and the inorganic nanoparticles by treating the electrolyte membrane with sulfuric acid.

Still another embodiment of the present specification provides a polymer electrolyte membrane including a structure in which a polymer including the unit of Chemical Formula 1 and having a sulfonate group is crosslinked with inorganic nanoparticles through a structure of the following Chemical Formula 6.

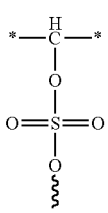

[Chemical Formula 6]

In Chemical Formula 6, is a site linking to a main chain of the polymer forming the polymer electrolyte membrane, and  a site bonding to the inorganic nanoparticles.

Yet another embodiment of the present specification provides a membrane electrode assembly including the electrolyte membrane described above.

Still yet another embodiment of the present specification provides a fuel cell including the membrane electrode assembly described above.

Advantageous Effects

A polymer electrolyte membrane according to one embodiment of the present specification has excellent durability and mechanical strength.

DESCRIPTION OF DRAWINGS

FIG. 1 illustrates bonding structures of polymer electrolyte membranes of Example 1 and Comparative Example 1 according to one embodiment of the present specification.

FIG. 2 is a graph comparing stress of electrolyte membranes of Example 1, Example 2 and Comparative Example 1 to Comparative Example 3 according to one embodiment of the present specification.

FIG. 3 is a graph comparing stress of electrolyte membranes of Comparative Example 4 and Comparative Example 5 according to one embodiment of the present specification.

FIG. 4 is a graph comparing humidity-dependent volumetric expansion of electrolyte membranes of Example 1, Example 2, Comparative Example 1 and Comparative Example 3 according to one embodiment of the present specification.

FIG. 5 is a graph comparing ion conductivity of electrolyte membranes of Example 1 and Comparative Example 1 to Comparative Example 3 according to one embodiment of the present specification.

FIG. 6 shows photographed SEM images of Example 1 and Comparative Example 3 according to one embodiment of the present specification.

MODE FOR DISCLOSURE

Hereinafter, the present specification will be described in more detail.

In the present specification, a certain part "including" certain constituents means capable of further including other constituents, and does not exclude other constituents unless particularly stated on the contrary.

Examples of the substituents in the present specification are described below, however, the substituents are not limited thereto.

The term "substitution" means a hydrogen atom bonding to a carbon atom of a compound is changed to another substituent, and the position of substitution is not limited as long as it is a position at which the hydrogen atom is substituted, that is, a position at which a substituent can substitute, and when two or more substituents substitute, the two or more substituents may be the same as or different from each other.

The term "substituted or unsubstituted" in the present specification means being substituted with one, two or more substituents selected from the group consisting of deuterium; a sulfonate group; a halogen group; a nitrile group; a substituted or unsubstituted alkyl group; and a substituted or unsubstituted aryl group, or having no substituents. In the present specification,  is a site bonding to other substituents or bonding sites.

In the present specification, the sulfonate group may be represented by groups such as —SO$_3$Q, and Q may be hydrogen or a group 1 element such as hydrogen (H), potassium (K) or sodium (Na). Accordingly, examples of the sulfonate group include —SO$_3$H, —SO$_3$Na, or —SO$_3$K.

In the present specification, the halogen group may be fluorine, chlorine, bromine or iodine.

In the present specification, the alkyl group may be linear or branched, and although not particularly limited thereto, the number of carbon atoms is preferably from 1 to 30. Specific examples thereof may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl and the like, but are not limited thereto.

In the present specification, the aryl group may be monocyclic or multicyclic, and when the aryl group is a monocyclic aryl group, the number of carbon atoms is not particularly limited, but is preferably from 6 to 30. Specific examples of the monocyclic aryl group may include a phenyl group, a biphenyl group, a terphenyl group and the like, but are not limited thereto.

When the aryl group is a multicyclic aryl group, the number of carbon atoms is not particularly limited, but is preferably from 10 to 30. Specific examples of the multicyclic aryl group may include a naphthyl group, an anthracenyl group, a phenanthryl group, a pyrenyl group, a perylenyl group, a chrysenyl group, a fluorenyl group or the like, but are not limited thereto.

In the present specification, the fluorenyl group may be substituted, and adjacent substituents may bond to each other to form a ring.

When the fluorenyl group is substituted,

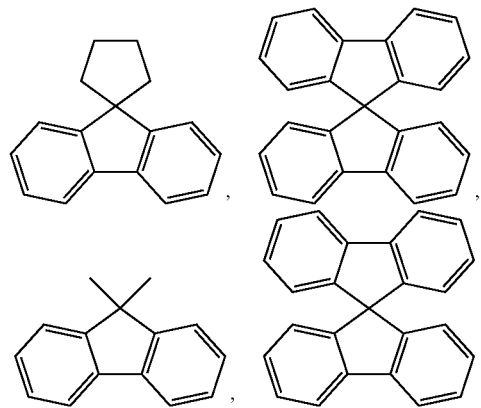

or the like may be included. However, the structure is not limited thereto.

In the present specification, the alkylene group means an alkyl group having two bonding sites, that is, a divalent group. Descriptions on the alkyl group provided above may be applied thereto except for each being a divalent group.

In the present specification, the arylene group means an aryl group having two bonding sites, that is, a divalent group. Descriptions on the aryl group provided above may be applied thereto except for each being a divalent group.

One embodiment of the present specification provides a method for preparing a polymer electrolyte membrane including preparing an electrolyte membrane including a polyarylene ether ketone polymer including a unit of the following Chemical Formula 1 and having a sulfonate group and inorganic nanoparticles including a hydroxyl group on a surface; reducing a ketone group of the polyarylene ether ketone polymer; and crosslinking the reduced polyarylene ether ketone polymer and the inorganic nanoparticles by treating the electrolyte membrane with sulfuric acid.

[Chemical Formula 1]

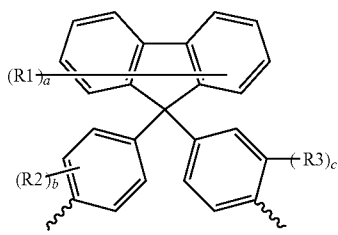

In Chemical Formula 1, R1 to R3 are the same as or different from each other and each independently hydrogen, an alkyl group or an aryl group, a is an integer of 0 to 8 and b and c are each an integer of 0 to 4, and when a to c are 2 or greater, substituents in the parentheses are the same as or different from each other.

Another embodiment of the present specification provides a method for preparing a polymer electrolyte membrane including reducing a ketone group of a polyarylene ether ketone polymer including the unit of Chemical Formula 1 and having a sulfonate group; preparing an electrolyte membrane including the reduced polyarylene ether ketone polymer and inorganic nanoparticles including a hydroxyl group on a surface; and crosslinking the reduced polyarylene ether ketone polymer and the inorganic nanoparticles by treating the electrolyte membrane with sulfuric acid.

In the present specification, the term "inorganic nanoparticles" means a nano-scaled particle-type inorganic material. Typical diameters of the inorganic nanoparticles are from 5 nm to 70 nm and preferably from 5 nm to 20 nm. Sizes of the inorganic nanoparticles may be properly controlled by changing a hydrolysis condition, a heating treatment condition and the like in the polymer electrolyte membrane preparation process. The inorganic nanoparticles in the present disclosure are not particularly limited as long as they include a hydroxyl group on the surface, and are capable of being stably present inside a crosslinked structure of the polymer electrolyte membrane (that is, a crosslinked structure with a main chain of the polymer membrane) prepared according to the present disclosure. Examples of the preferred inorganic nanoparticles in the present disclosure may include $Al_2O_3$, $Y_2O_3$, $SiO_2$, $TiO_2$, $ZrO_2$, $WO_3$, $NiO$ and the like. In the present disclosure, the more preferred inorganic nanoparticles are $SiO_2$.

When the inorganic nanoparticles include the hydroxyl group on the surface, chemical crosslinking is formed with a hydroxyl group of the reduced polyarylene ether ketone polymer, and a polymer electrolyte membrane having high durability may be formed.

According to one embodiment of the present specification, the reducing of a ketone group of the polyarylene ether ketone polymer may be carried out using $NaBH_4$ or $LiAlH_4$, and $NaBH_4$ that is advantageous in terms of experimental stability may be preferably used.

Specifically, when the reducing of a ketone group of the polyarylene ether ketone polymer is carried out after preparing an electrolyte membrane including a polyarylene ether ketone polymer and inorganic nanoparticles, the reduction may be carried out by immersing the electrolyte membrane in an aqueous $NaBH_4$ or $LiAlH_4$ solution for 24 hours.

When reducing of a ketone group of the polyarylene ether ketone polymer is carried out before preparing an electrolyte membrane including a polyarylene ether ketone polymer and inorganic nanoparticles, the reduction may be carried out by reacting the polyarylene ether ketone polymer with $NaBH_4$ or $LiAlH_4$ for 12 hours.

According to one embodiment of the present specification, in the preparing of an electrolyte membrane including a polyarylene ether ketone polymer and inorganic nanoparticles including a hydroxyl group on a surface, a content of the inorganic nanoparticles may be from 1% by weight to 10% by weight, preferably from 3% by weight to 7% by weight and more preferably from 4% by weight to 6% by weight with respect to 100% by weight of the polyarylene ether ketone polymer.

According to another embodiment of the present specification, in the preparing of an electrolyte membrane including the reduced polyarylene ether ketone polymer and inorganic nanoparticles including a hydroxyl group on a surface, a content of the inorganic nanoparticles may be from 1% by weight to 10% by weight, preferably from 3% by weight to 7% by weight and more preferably from 4% by weight to 6% by weight with respect to 100% by weight of the reduced polyarylene ether ketone polymer.

When the content of the inorganic nanoparticles is included in the above-mentioned range, a hydrophilic effect, an ion conductivity enhancing effect obtained by crosslinking with the polymer and a durability enhancing effect of the inorganic nanoparticles may be maximized. Meanwhile, when the content of the inorganic nanoparticles is less than 1% by weight, the effects described above may not be obtained sufficiently, and the content being greater than 10% by weight causes a problem in the inorganic nanoparticle dispersion and membrane uniformity and ion conductivity may become worse.

According to one embodiment of the present specification, the polyarylene ether ketone polymer including the unit of Chemical Formula 1 and having a sulfonate group includes a unit of the following Chemical Formula 2 and a unit of the following Chemical Formula 3.

[Chemical Formula 2]

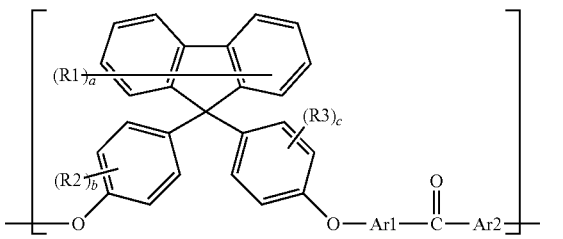

[Chemical Formula 3]

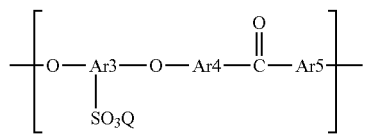

According to one embodiment of the present specification, in Chemical Formulae 2 and 3, R1 to R3 and a to c have the same definitions as in Chemical Formula 1, Ar1 to Ar5 are the same as or different from each other and each independently a substituted or unsubstituted arylene group, and Q is hydrogen (H), potassium (K) or sodium (Na).

According to one embodiment of the present specification, the polymer crosslinked with the inorganic nanoparticles through crosslinking the reduced polyarylene ether ketone polymer and the inorganic nanoparticles by treating the electrolyte membrane with sulfuric acid includes a unit of the following Chemical Formula 4 and a unit of the following Chemical formula 5.

According to one embodiment of the present specification, the polymer crosslinked with the inorganic nanoparticles includes a unit of the following Chemical Formula 7.

[Chemical Formula 7]

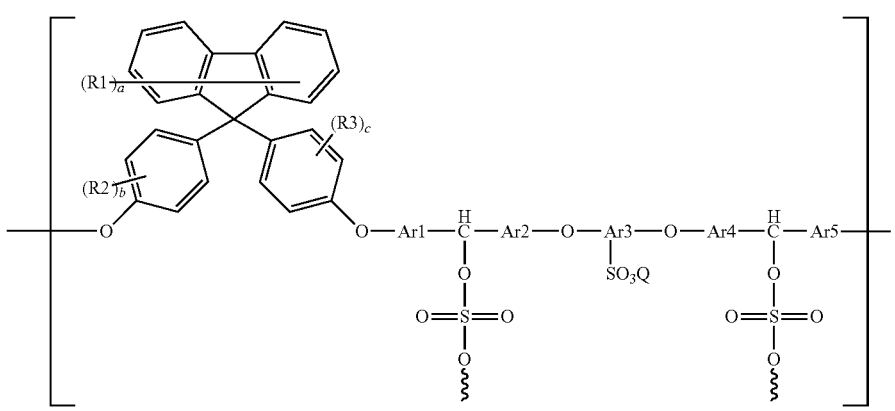

[Chemical Formula 4]

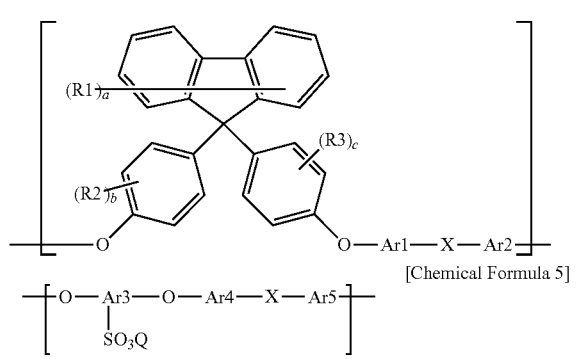

[Chemical Formula 5]

In Chemical Formulae 4 and 5, R1 to R3 and a to c have the same definitions as in Chemical Formula 1, Ar1 to Ar5 are the same as or different from each other and each independently a substituted or unsubstituted arylene group, Q is hydrogen (H), potassium (K) or sodium (Na), and X is —C(=O)—, —C(—OH)H— or the following Chemical Formula 6,

[Chemical Formula 6]

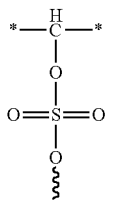

in Chemical Formula 6, * is a site linking to a main chain of the polymer forming the polymer electrolyte membrane, and 〰 is a site bonding to the inorganic nanoparticles.

According to one embodiment of the present specification, when all ketone groups of the polyarylene ether ketone polymer are reduced, X in Chemical Formulae 4 and 5 is —C(—OH)H— or Chemical Formula 6.

In Chemical Formula 7, R1 to R3 and a to c have the same definitions as in Chemical Formula 1, Ar1 to Ar5 are the same as or different from each other and each independently a substituted or unsubstituted arylene group, Q is hydrogen (H), potassium (K) or sodium (Na), and 〰 is a site bonding to the inorganic nanoparticles.

One embodiment of the present specification provides a polymer electrolyte membrane prepared using the preparation method described above.

One embodiment of the present specification provides a polymer electrolyte membrane including a structure in which a polymer including the unit of Chemical Formula 1 and having a sulfonate group is crosslinked with inorganic nanoparticles through a structure of the following Chemical Formula 6.

[Chemical Formula 1]

[Chemical Formula 6]

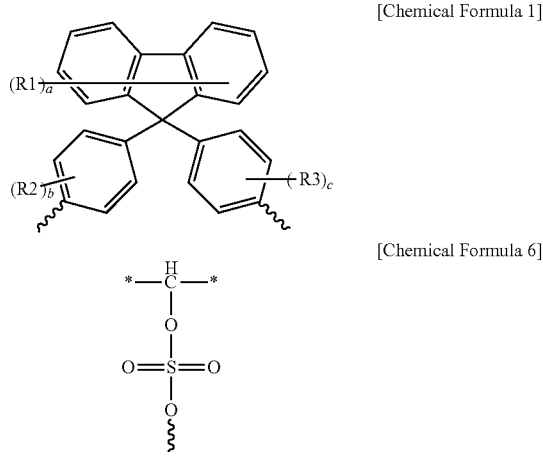

In Chemical Formula 1, R1 to R3 are the same as or different from each other and each independently hydrogen, an alkyl group or an aryl group, a is an integer of 0 to 8, b and c are each an integer of 0 to 4, and when a to c are 2 or greater, substituents in the parentheses are the same as or different from each other, and in Chemical Formula 6, * is a site linking to a main chain of the polymer forming the polymer electrolyte membrane, and  is a site bonding to the inorganic nanoparticles.

According to one embodiment of the present specification, the polymer electrolyte membrane includes the unit of Chemical Formula 4 and the unit of the following Chemical Formula 5 described above.

According to one embodiment of the present specification, the polymer electrolyte membrane includes a unit of the following Chemical Formula 7.

[Chemical Formula 7]

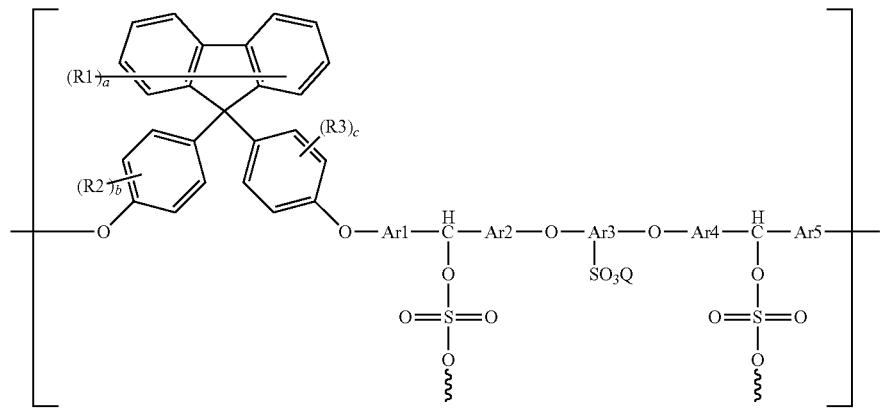

In Chemical Formula 7, R1 to R3 and a to c have the same definitions as in Chemical Formula 1, Ar1 to Ar5 are the same as or different from each other and each independently a substituted or unsubstituted arylene group, Q is hydrogen (H), potassium (K) or sodium (Na), and  is a site bonding to the inorganic nanoparticles.

One embodiment of the present specification provides a membrane electrode assembly including the electrolyte membrane described above.

One embodiment of the present specification provides a fuel cell including the membrane electrode assembly.

The fuel cell of the present specification includes fuel cells generally known in the art. Specifically, the fuel cell may include a stack including the membrane electrode assembly and a separator provided between the membrane electrode assemblies; a fuel supply unit supplying fuel to the stack; and an oxidizer supply unit supplying an oxidizer to the stack.

The stack includes one, two or more of the membrane electrode assemblies, and when including two or more membrane electrode assemblies, a separator provided therebetween is included.

The separator performs a role of preventing the membrane electrode assemblies from being electrically connected to each other, and transferring fuel and oxidizer supplied from the outside to the membrane electrode assemblies.

The oxidizer supply unit performs a role of supplying an oxidizer to the stack. Oxygen is typically used as the oxidizer, and oxygen or air may be injected using a pump when used.

The fuel supply unit performs a role of supplying fuel to the stack, and may be formed with a fuel tank storing fuel and a pump supplying the fuel stored in the fuel tank to the stack. As the fuel, hydrogen or hydrocarbon fuel in a gas or liquid state may be used. Examples of the hydrocarbon fuel may include methanol, ethanol, propanol, butanol or natural gas.

Hereinafter, the present specification will be described in detail with reference to examples. However, examples according to the present specification may be modified to various different forms, and the scope of the present specification is not to be construed as being limited to the examples described below. Examples of the present specification are provided in order to more fully describe the present specification to those having average knowledge in the art.

Preparation Example

1) Preparation of Hydrocarbon-Based Polymer

Hydroquinonesulfonic acid potassium salt (0.9 eq.), 4,4'-difluorobenzophenone (0.97 eq.) and 3,5-bis(4-fluorobenzoyl)phenyl(4-fluorophenyl)methanone (0.02 eq.) were introduced to a 1 L round bottom flask equipped with a Dean-Stark trap and a condenser, and prepared under nitrogen atmosphere using potassium carbonate ($K_2CO_3$) as a catalyst in a dimethyl sulfoxide (DMSO) and benzene solvent. Next, the reaction mixture was stirred for 4 hours in an oil bath at a temperature of 140° C., and after removing an azeotropic mixture by adsorbing the azeotropic mixture to molecular sieves of the Dean-Stark trap while benzene flowed backward, the reaction temperature was raised to 180° C., and the result was condensation polymerization reacted for 20 hours. After the reaction was terminated, the temperature of the reactant was lowered to 60° C., 4,4'-difluorobenzophenone (0.2275 eq.), 9,9-bis(hydroxyphenyl)fluorine (0.335 eq.) and 3,5-bis(4-fluorobenzoyl)phenyl(4-fluorophenyl)-methanone (0.005 eq.) were introduced to the same flask, and the reaction was started again using $K_2CO_3$ as a catalyst using dimethyl sulfoxide (DMSO) and benzene under nitrogen atmosphere.

Next, the reaction mixture was stirred again for 4 hours in an oil bath at a temperature of 140° C., and after removing an azeotropic mixture by adsorbing the azeotropic mixture to molecular sieves of the Dean-Stark trap while benzene flowed backward, the reaction temperature was raised to 180° C., and the result was condensation polymerization reacted for 20 hours. Then the temperature of the reactant was lowered to room temperature, and dimethyl sulfoxide (DMSO) was further added to dilute a product, and the diluted product was poured into excess ethanol to separate a copolymer from the solvent. After that, excess potassium carbonate was removed using water, and then the copolymer obtained from filtration was dried for 12 hours or longer in a vacuum oven at 80° C. to prepare a branched sulfonated multi-block copolymer of the following chemical formula in which hydrophobic blocks and hydrophilic blocks are alternatively linked through chemical bonds.

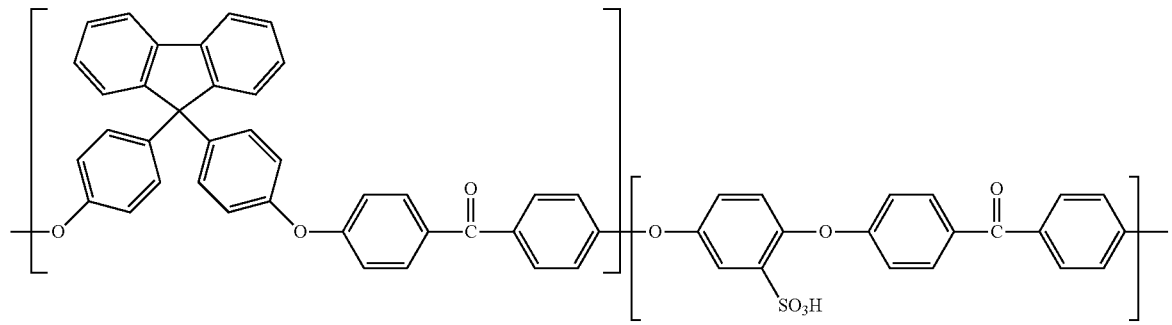

2) Preparation of Silica Nanoparticles (Fumed Silica)

Fumed silica was prepared by a high temperature gas phase reaction hydrolyzing chlorosilane in flames of 1000° C. or higher formed with oxygen and hydrogen. Basic particles made in the flames were linked to each other through collision to form secondary particles while still being dissolved on the surface, and as a result, aggregates and agglomerates linked in a three-dimensional branched form were produced. After the reaction, hydrogen chloride gas remaining in the silica was removed under a high temperature air condition. Density of the fumed silica was very low immediately after preparation, and therefore, the density was raised to 50 g/L or greater using a method of deflation using a pressure reducing device.

After that, the silica particles were surface treated with a hydroxyl group (—OH) to prepare hydrophilic silica particles.

3) Preparation of Silica Nanoparticle-Added Composite Membrane

The hydrocarbon-based polymer synthesized in 1) and the silica particles prepared in 2) in a ratio of 5% by weight with respect to 100% by weight of the hydrocarbon-based polymer were added to a dimethyl sulfoxide (DMSO) solvent, and then the result was filtered to prepare a silica polymer composition.

The prepared silica polymer composition was dried for 24 hours in an oven at 80° C. to prepare a silica-added hydrocarbon-based composite membrane. The prepared composite membrane was acid treated for 24 hours at 80° C. using 10 wt % sulfuric acid, washed 4 times or more with distilled water, and then dried at 80° C. to prepare a polymer electrolyte membrane.

Example 1

Crosslinking was progressed by immersing the polymer electrolyte membrane including silica nanoparticles prepared according to Steps 1) to 3) of the preparation example in an aqueous 5 wt % sodium borohydride ($NaBH_4$) solution for 24 hours at room temperature, then washing with ion-removed distilled water, and then placing in a 1 M sulfuric acid ($H_2SO_4$) solution.

Example 2

A polymer electrolyte membrane was prepared by adding sodium borohydride ($NaBH_4$) to an electrolyte polymer solution including the polymer prepared according to Step 1) of the preparation example and the silica nanoparticles prepared according to Step 2) of the preparation example in a ratio of 1% by weight with respect to 100% by weight of the polymer in a dimethyl sulfoxide (DMSO) solvent, and reacting the result for 12 hours at 120° C. Crosslinking was progressed by drying the prepared polymer electrolyte membrane, washing with ion-removed distilled water, and then placing in a 1 M sulfuric acid ($H_2SO_4$) solution.

Comparative Example 1

A polymer electrolyte membrane was prepared by adding the polymer without including silica particles prepared according to Step 1) of the preparation example to a dimethyl sulfoxide (DMSO) solvent, and drying for 24 hours in an oven at 80° C.

Comparative Example 2

For the polymer electrolyte membrane prepared in Comparative Example 1, crosslinking was progressed in the same manner as in Example 1.

Comparative Example 3

For the polymer electrolyte membrane including silica nanoparticles prepared according to Steps 1) to 3) of the preparation example, crosslinking was not progressed.

Comparative Example 4

A polymer electrolyte membrane was prepared by adding Nafion 211 that does not include a ketone group as in the following chemical formula to a dimethyl sulfoxide (DMSO) solvent without adding silica nanoparticles, and then drying for 24 hours in an oven at 80° C.

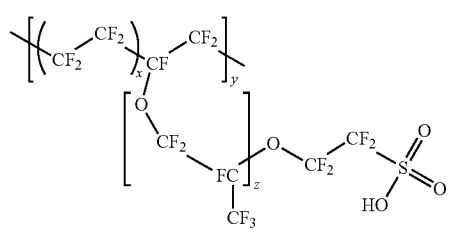

Comparative Example 5

For the polymer electrolyte membrane prepared in Comparative Example 4, crosslinking was progressed in the same manner as in Example 1.

Experimental Example 1. Mechanical Strength Measurement

Mechanical strength of the electrolyte membranes prepared in Example 1 and Comparative Examples 1 to 5 was measured, and the results are as shown in FIG. 2 and FIG. 3. Mechanical strength was measured using a method of applying stress to each of the polymer films and measuring strain caused therefrom using a Universal Test Machine (UTM).

When examining FIG. 2, it was seen that, for the polymer electrolyte membrane including silica particles, Examples 1 and 2 that went through the crosslinking process had significantly enhanced stress compared to Comparative Example 3 that did not go through the crosslinking process. In addition, through the comparison between Comparative Example 1 and Comparative Example 2, it was seen that, for the polymer electrolyte membrane that did not include silica particles, high stress was exhibited as well when going through the crosslinking process.

When examining FIG. 3, it was identified that, when using a polymer that does not include a ketone group, an effect of enhancing stress was not obtained even when the crosslinking process was applied as in Comparative Example 5 compared to Comparative Example 4 that did not go through the crosslinking process.

Experimental Example 2. Wet Expansion Measurement

For Example 1, Example 2, Comparative Example 1 and Comparative Example 3, volumetric expansion of the electrolyte membranes were each measured in a dry state and a humid state. Specifically, the electrolyte membrane was cut to a 5 cm×5 cm size, and a width and a thickness depending on each condition were measured.

As shown in FIG. 4, it was identified that volumetric expansion decreased in Example 1, Example 2 and Comparative Example 3 due to silica containment. Among these, it was identified that Examples 1 and 2 having a crosslinked structure exhibited lowest volumetric expansion compared to Comparative Examples 1 and 3. Accordingly, it was seen that the electrolyte membrane according to the present disclosure had excellent humid condition-dependent mechanical stability.

Experimental Example 3. Ion Conductivity Evaluation

In order to measure performance of the electrolyte membranes prepared in Example 1 and Comparative Examples 1 to 3, ion conductivity of the electrolyte membranes was evaluated, and the results are shown in FIG. 5.

In FIG. 5, ion conductivity of Example 1 under a low humid condition was significantly high compared to Comparative Example 1, and enhancement in the membrane performance was identified. This is considered as an effect of the silica included in the electrolyte membrane, and a similar result was also obtained in Comparative Example 3.

However, unlike Comparative Example 3, binding of the polymer and the silica interface was enhanced through crosslinking and a stable electrolyte membrane was formed in Example 1, and therefore, enhanced ion conductivity was identified in the whole humid region, and the effect of crosslinking was also seen through enhanced ion conductivity in Comparative Example 2 that did not include silica.

The invention claimed is:

1. A method for preparing a polymer electrolyte membrane comprising:
    preparing an electrolyte membrane including a polyarylene ether ketone polymer including a unit of the following Chemical Formula 1 and having a sulfonate group and inorganic nanoparticles including a hydroxyl group on a surface;
    reducing a ketone group of the polyarylene ether ketone polymer; and
    crosslinking the reduced polyarylene ether ketone polymer and the inorganic nanoparticles by treating the electrolyte membrane with sulfuric acid,
    wherein the polymer crosslinked with the inorganic nanoparticles includes a unit of the following Chemical Formula 4 and a unit of the following Chemical Formula 5:

[Chemical Formula 1]

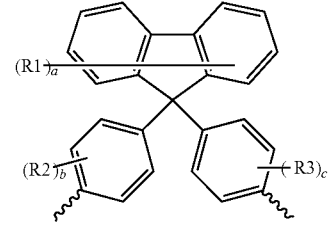

wherein, in Chemical Formula 1, R1 to R3 are the same as or different from each other and each independently hydrogen, an alkyl group or an aryl group;
a is an integer of 0 to 8 and b and c are each an integer of 0 to 4; and
when a to c are 2 or greater, substituents in the parentheses are the same as or different from each other,

[Chemical Formula 4]

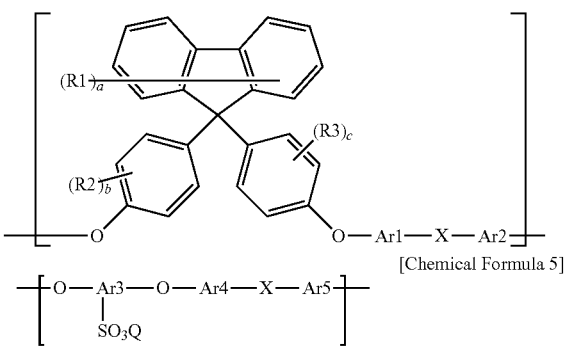

[Chemical Formula 5]

in Chemical Formulae 4 and 5, R1 to R3 and a to c have the same definitions as in Chemical Formula 1;
Ar1 to Ar5 are the same as or different from each other and each independently a substituted or unsubstituted arylene group;
Q is hydrogen (H), potassium (K) or sodium (Na); and X is —C(=O)—, —C(—OH)H— or the following Chemical Formula 6;

[Chemical Formula 6]

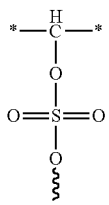

in Chemical Formula 6, * is a site linking to a main chain of the polymer forming the polymer electrolyte membrane; and ⁓⁓⁓ is a site bonding to the inorganic nanoparticles.

2. The method for preparing a polymer electrolyte membrane of claim 1, wherein, in the preparing of an electrolyte membrane including a polyarylene ether ketone polymer and inorganic nanoparticles including a hydroxyl group on a surface, a content of the inorganic nanoparticles is from 1% by weight to 10% by weight with respect to 100% by weight of the polyarylene ether ketone polymer.

3. The method for preparing a polymer electrolyte membrane of claim 1, wherein the reducing of a ketone group of the polyarylene ether ketone polymer is carried out using $NaBH_4$ or $LiAlH_4$.

4. The method for preparing a polymer electrolyte membrane of claim 1, wherein the polyarylene ether ketone polymer including the unit of Chemical Formula 1 and having a sulfonate group includes a unit of the following Chemical Formula 2 and a unit of the following Chemical Formula 3:

[Chemical Formula 2]

[Chemical Formula 3]

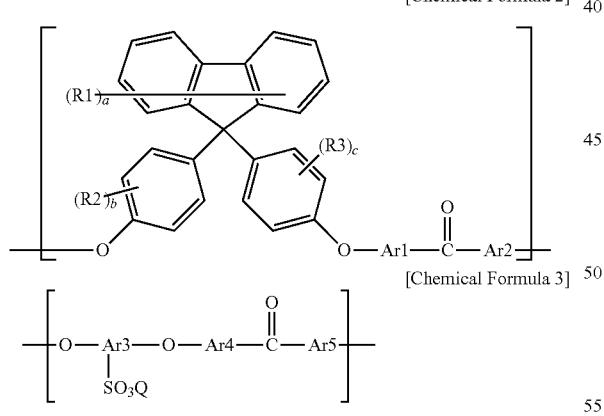

in Chemical Formulae 2 and 3, R1 to R3 and a to c have the same definitions as in Chemical Formula 1;
Ar1 to Ar5 are the same as or different from each other and each independently a substituted or unsubstituted arylene group; and
Q is hydrogen (H), potassium (K) or sodium (Na).

5. A method for preparing a polymer electrolyte membrane comprising:
reducing a ketone group of a polyarylene ether ketone polymer including a unit of the following Chemical Formula 1 and having a sulfonate group;

preparing an electrolyte membrane including the reduced polyarylene ether ketone polymer and inorganic nanoparticles including a hydroxyl group on a surface; and
crosslinking the reduced polyarylene ether ketone polymer and the inorganic nanoparticles by treating the electrolyte membrane with sulfuric acid:

[Chemical Formula 1]

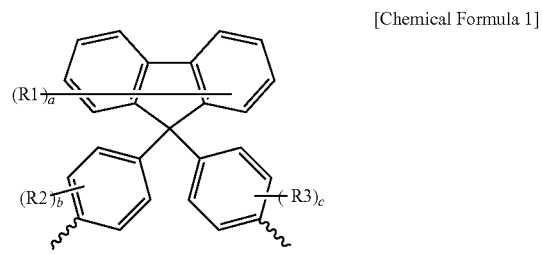

wherein, in Chemical Formula 1, R1 to R3 are the same as or different from each other and each independently hydrogen, an alkyl group or an aryl group;
a is an integer of 0 to 8 and b and c are each an integer of 0 to 4; and
when a to c are 2 or greater, substituents in the parentheses are the same as or different from each other,
wherein the polymer crosslinked with the inorganic nanoparticles includes a unit of the following Chemical Formula 4 and a unit of the following Chemical Formula 5:

[Chemical Formula 4]

[Chemical Formula 5]

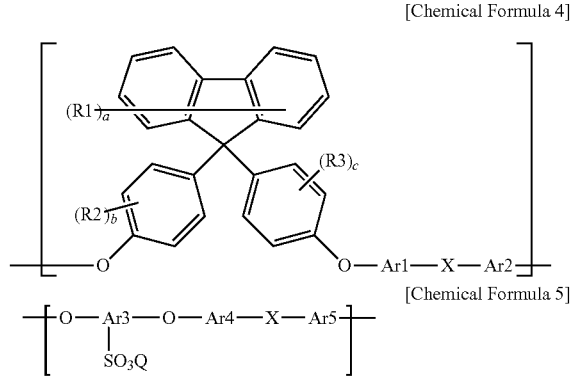

in Chemical Formulae 4 and 5, R1 to R3 and a to c have the same definitions as in Chemical Formula 1;
Ar1 to Ar5 are the same as or different from each other and each independently a substituted or unsubstituted arylene group;
Q is hydrogen (H), potassium (K) or sodium (Na); and
X is —C(=O)—, —C(—OH)H— or the following Chemical Formula 6;

[Chemical Formula 6]

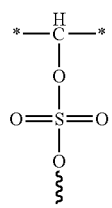

in Chemical Formula 6, * is a site linking to a main chain of the polymer forming the polymer electrolyte membrane; and  is a site bonding to the inorganic nanoparticles.

6. The method for preparing a polymer electrolyte membrane of claim 5, wherein, in the preparing of an electrolyte membrane including the reduced polyarylene ether ketone polymer and inorganic nanoparticles including a hydroxyl group on a surface, a content of the inorganic nanoparticles is from 1% by weight to 10% by weight with respect to 100% by weight of the reduced polyarylene ether ketone polymer.

7. The method for preparing a polymer electrolyte membrane of claim 2, wherein the reducing of a ketone group of the polyarylene ether ketone polymer is carried out using $NaBH_4$ or $LiAlH_4$.

8. The method for preparing a polymer electrolyte membrane of claim 5, wherein the polyarylene ether ketone polymer including the unit of Chemical Formula 1 and having a sulfonate group includes a unit of the following Chemical Formula 2 and a unit of the following Chemical Formula 3:

[Chemical Formula 2]

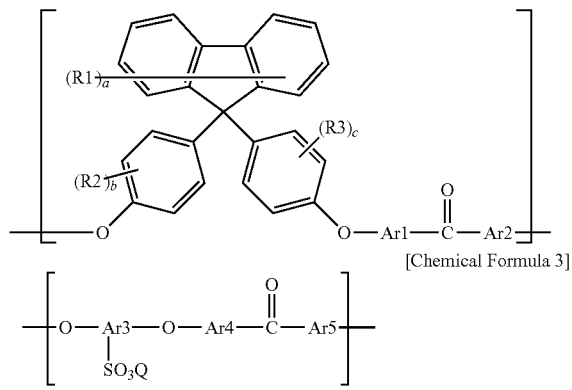

[Chemical Formula 3]

in Chemical Formulae 2 and 3, R1 to R3 and a to c have the same definitions as in Chemical Formula 1;

Ar1 to Ar5 are the same as or different from each other and each independently a substituted or unsubstituted arylene group; and Q is hydrogen (H), potassium (K) or sodium (Na).

9. A polymer electrolyte membrane comprising a structure in which a polymer including a unit of the following Chemical Formula 1 and having a sulfonate group is cross-linked with inorganic nanoparticles through a structure of the following Chemical Formula 6:

[Chemical Formula 1]

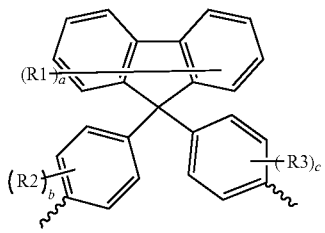

[Chemical Formula 6]

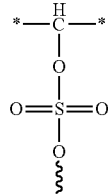

wherein, in Chemical Formula 1, R1 to R3 are the same as or different from each other and each independently hydrogen, an alkyl group or an aryl group;

a is an integer of 0 to 8 and b and c are each an integer of 0 to 4; and when a to c are 2 or greater, substituents in the parentheses are the same as or different from each other, in Chemical Formula 6, * is a site linking to a main chain of the polymer forming the polymer electrolyte membrane; and  is a site bonding to the inorganic nanoparticles, and wherein the polymer electrolyte membrane comprises a unit of the following Chemical Formula 4 and a unit of the following Chemical Formula 5:

[Chemical Formula 4]

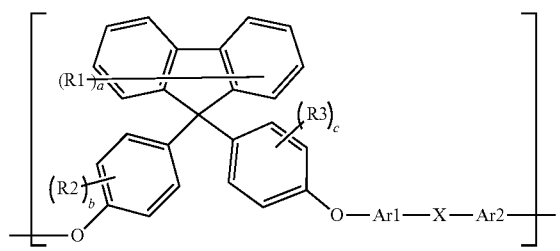

[Chemical Formula 5]

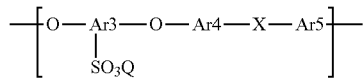

wherein, in Chemical Formulae 4 and 5, R1 to R3 and a to c have the same definitions as in chemical Formula 1;

Ar1 to Ar5 are the same as or different from each other and each independently a substituted or unsubstituted arylene group;

Q is hydrogen (H), potassium (K) or sodium (Na); and

X is —C(=O)—, —C(—OH)H— or Chemical Formula 6.

10. The polymer electrolyte membrane of claim 9 comprising a unit of the following Chemical Formula 7:

[Chemical Formula 7]

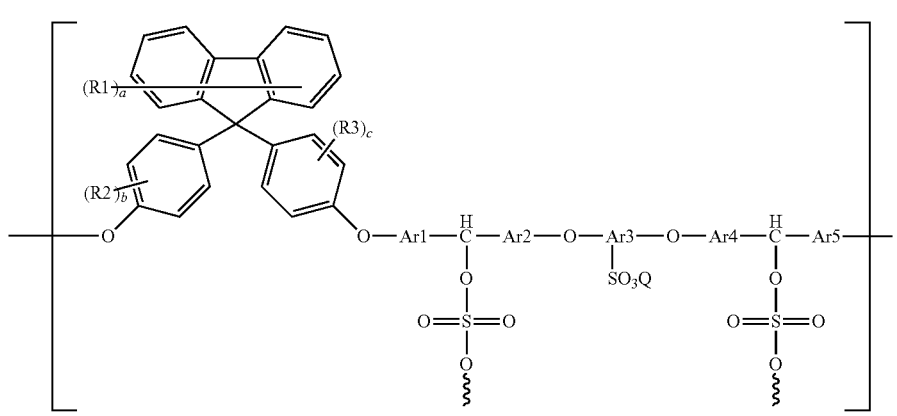

wherein, in Chemical Formula 7, R1 to R3 and a to c have the same definitions as in claim 9;

Ar1 to Ar5 are the same as or different from each other and each independently a substituted or unsubstituted arylene group;

Q is hydrogen (H), potassium (K) or sodium (Na); and

 is a site bonding to the inorganic nanoparticles.

11. A membrane electrode assembly comprising the polymer electrolyte membrane of claim 10.

12. A membrane electrode assembly comprising the polymer electrolyte membrane of claim 9.

13. A fuel cell comprising the membrane electrode assembly of claim 12.

* * * * *